(12) United States Patent
Hwang et al.

(10) Patent No.: US 11,095,398 B2
(45) Date of Patent: Aug. 17, 2021

(54) ELECTRONIC DEVICE AND METHOD FOR SELECTING REPRESENTATION MATRIX AND MEASUREMENT MATRIX USED FOR COMPRESSING DATA BASED ON MACHINE LEARNING

(71) Applicant: GIST (Gwangju Institute of Science and Technology), Gwangju (KR)

(72) Inventors: Eui Seok Hwang, Gwangju (KR); Jun Ho Song, Gwangju (KR); Yong Gu Lee, Gwangju (KR)

(73) Assignee: GIST (Gwangju Institute of Science and Technology), Gwangju (KR)

( * ) Notice: Subject to any disclaimer, the term of this patent is extended or adjusted under 35 U.S.C. 154(b) by 0 days.

(21) Appl. No.: 16/860,462

(22) Filed: Apr. 28, 2020

(65) Prior Publication Data

US 2021/0152277 A1    May 20, 2021

(30) Foreign Application Priority Data

Nov. 14, 2019    (KR) .................. 10-2019-0146007

(51) Int. Cl.
| | | |
|---|---|---|
| *H04L 27/00* | (2006.01) | |
| *H04L 1/00* | (2006.01) | |
| *H04L 29/06* | (2006.01) | |
| *G06F 11/14* | (2006.01) | |
| *G06N 20/00* | (2019.01) | |

(52) U.S. Cl.
CPC .......... *H04L 1/009* (2013.01); *G06F 11/1443* (2013.01); *G06N 20/00* (2019.01); *H04L 1/0091* (2013.01); *H04L 69/04* (2013.01)

(58) Field of Classification Search
CPC ....... H04L 1/009; H04L 69/04; H04L 1/0091; G06F 11/1443; G06N 20/00
USPC ........................................................ 375/295
See application file for complete search history.

(56) References Cited

U.S. PATENT DOCUMENTS

| | | | |
|---|---|---|---|
| 7,009,533 B1 * | 3/2006 | Wegener | H04N 1/413 341/76 |
| 10,638,135 B1 * | 4/2020 | Wei | H04N 19/167 |
| 2017/0127034 A1 * | 5/2017 | Urisaka | H04N 9/69 |

* cited by examiner

*Primary Examiner* — Helene E Tayong
(74) *Attorney, Agent, or Firm* — Studebaker & Brackett PC

(57) ABSTRACT

A first electronic device according to various embodiments may select one of a plurality of representation matrices and one of a plurality of measurement matrices on the basis of a pattern and/or feature of data received from a sensor. The selection of the representation matrix and the measurement matrix may be performed on the basis of machine learning. Based on the selected representation matrix and measurement matrix, the first electronic device may adaptively compress at least a portion of the data. A second electronic device according to various embodiments may restore compressed data on the basis of the result of selecting the representation matrix and the measurement matrix. By dynamically selecting the representation matrix and the measurement matrix on the basis of machine learning, it is possible to reduce an error in the data restored by the second electronic device (e.g., a restoration error).

10 Claims, 6 Drawing Sheets

ELECTRONIC DEVICE AND METHOD FOR SELECTING REPRESENTATION MATRIX AND MEASUREMENT MATRIX USED FOR COMPRESSING DATA BASED ON MACHINE LEARNING

CROSS-REFERENCE TO RELATED APPLICATION

This application claims priority to and the benefit of Korean Patent Application No. 10-2019-0146007, filed on Nov. 14, 2019, the disclosure of which is incorporated herein by reference in its entirety.

BACKGROUND

1. Field of the Invention

Various embodiments disclosed in the present invention relate to an electronic device and method for selecting a representation matrix and a measurement matrix which are used to compress data on the basis of machine learning.

2. Discussion of Related Art

A smart grid is an electric power grid system that combines information and communication technology with production, transmission, and consumption of electricity. Electricity suppliers and consumers may interact with each other on the basis of the information and communication technology. For example, for efficient energy management within a smart grid, data may be collected from distributed objects (e.g., sensors that detect electric power consumption in a consumer's home and/or office) and/or may be monitored. In order to efficiently manage a large amount of data collected and/or detected in a smart grid, a technique for compressing the data (compressive sensing) with low computational complexity has been developed.

SUMMARY OF THE INVENTION

Assuming that data is compressed based on compressive sensing, a restoration error may inevitably occur when the compressed data is restored. Accordingly, a method of efficiently compressing data while reducing a restoration error may be required.

According to an aspect of the present invention, there is provided an electronic device including at least one sensor, a communication processor, a memory, and at least one processor operably coupled to the at least one sensor, the communication processor, and the memory. The memory may store a plurality of instructions. When the plurality of instructions are executed by the at least one processor, the at least one processor may perform control to identify a first signal output from the at least one sensor, compress a first part of the first signal on the basis of first information in response to the identification of the first signal, compress a second part of the first signal distinct from the first part on the basis of second information distinct from the first information, acquire a second signal including the compressed first part and the compressed second part, and transmit the second signal to an external electronic device distinct from the electronic device using a communication processor in response to the acquisition of the second signal.

According to another aspect of the present invention, there is provided an electronic device including a communication processor, a memory, and at least one processor operably coupled to the communication processor and the memory. The memory may store a plurality of instructions. When the plurality of instructions are executed by the at least one processor, the at least one processor may perform control to receive a first signal from an external electronic device distinct from the electronic device using the communication processor, acquire information corresponding to at least a portion of the first signal in response to the reception of the first signal, and restore a second signal corresponding to the first signal by changing at least a portion of the first signal on the basis of the information in response to the acquisition of the information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
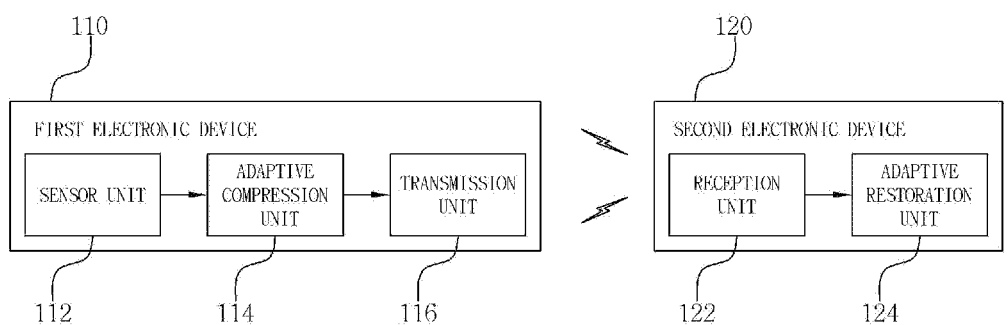
FIG. 1 is a block diagram showing a first electronic device and a second electronic device according to an embodiment.

Specific structural or functional descriptions of embodiments according to the inventive concept disclosed herein have merely been illustrated for the purpose of describing the embodiments according to the inventive concept, and the embodiments according to the inventive concept may be implemented in various forms and are not limited to the embodiments described herein.

Since the embodiments according to the inventive concept may be changed in various ways and may have several forms, the embodiments are illustrated in the drawings and described in detail herein. However, there is no intent to limit the embodiments according to the inventive concept to the particular forms disclosed. Conversely, the embodiments are to cover modifications, equivalents, and alternatives falling within the scope of the invention.

In addition, terms such as "first" or "second" may be used to describe various elements, but these elements are not limited by these terms. These terms are used to only distinguish one element from another element. For example, a first element could be termed a second element, and, similarly, a second element could be termed a first element without departing from the scope of the inventive concept.

When it is mentioned that a certain element is "coupled to" or "connected to" another element, it should be understood that the certain element may be directly coupled or connected to the other element or that still another element may be located therebetween. Conversely, when it is mentioned that a certain element is referred to as being "directly connected to" or "directly coupled to" another element, it should be understood that there are no intervening elements present. Further, other expressions describing the relationships between elements should be interpreted in the same way (e.g., "between" versus "directly between," "adjacent" versus "directly adjacent," etc.).

The terminology used herein is merely for the purpose of describing particular embodiments and is not intended to limit the scope of the present invention. As used herein, the singular forms "a," "an," and "the" are intended to include the plural forms as well, unless the context clearly indicates otherwise. It should be further understood that the terms "comprise," "include," or "have" as used herein specify the presence of stated features, numerals, steps, operations, elements, components, or a combination thereof, but do not preclude the presence or addition of one or more other features, numerals, steps, operations, elements, components, or combinations thereof.

Unless otherwise defined, all terms (including technical and scientific terms) used herein have the same meaning as commonly understood by those skilled in the art. Generally used terms, such as terms defined in dictionaries, should be construed as having meanings matching contextual meanings in the art. In this description, unless defined clearly, terms are not to be construed as having ideal or excessively formal meanings.

Hereinafter, embodiments will be described in detail with reference to the accompanying drawings. However, the scope of the claims is not limited or restricted by these embodiments. Like reference numerals in each drawing denote like members.

FIG. 1 is a block diagram 100 showing a first electronic device 110 and a second electronic device 120 according to an embodiment. The first electronic device 110 and the second electronic device 120 may refer to electronic devices for transmitting and/or receiving data in a smart grid. For example, the first electronic device 110 may be an electronic device for collecting various types of data associated with electric power consumption in the smart grid. For example, the first electronic device 110 may be an electric power meter deployed in a home and/or office or an access point (AP) and/or a router configured to communicate with various electronic devices that consume electricity. As another example, the first electronic device 110 may be a home appliance itself that consumes electric power.

Referring to FIG. 1, the first electronic device 110 may include a sensor unit 112, an adaptive compression unit 114, a transmission unit 116, or a combination thereof. The sensor unit 112, the adaptive compression unit 114, and the transmission unit 116 may electrically communicate with each other through, for example, an electronic element (not shown) such as a communication bus (not shown).

The sensor unit 112 of the first electronic device 110 according to an embodiment may output data associated with energy consumption of a target device such as the first electronic device 110 and/or an external electronic device connected to the first electronic device 110. For example, the sensor unit 112 may include at least one of a temperature sensor and a voltmeter or ammeter for measuring the amount of electric power. For example, the sensor unit 112 may output data for identifying at least one of heat generated in the target device, the amount of electric power input to the target device, and the amount of electric power consumed in a circuit element or hardware component included in the target device.

The adaptive compression unit 114 according to an embodiment may adaptively compress the data output from the sensor unit 112. The adaptive compression unit 114 may not apply a single compressing method to the entirety of the data but may apply different compressing methods to distinct portions of the data. For example, the adaptive compression unit 114 may classify data on the basis of the class and/or type of the data. The adaptive compression unit 114 classifying data may be performed by, for example, a neural network that is trained on the basis of machine learning. The neural network may be software or hardware trained to provide a generalized output to an input or a combination thereof. For example, the neural network may be trained to select a compression method and/or a restoration method for supporting restoration having the smallest error and/or the most efficient compression according to the form and/or characteristics of data.

The adaptive compression unit 114 may select any one of a plurality of compression methods and compress the data on the basis of the class and/or type of the data. There may be a plurality of classes and/or a plurality of types for classifying data on the basis of the form, format, and/or features of the data. The adaptive compression unit 114 may compress at least a portion of data output from the sensor unit 112 (e.g., a portion of data split into a designated size, such as a time window) on the basis of compression methods corresponding to the plurality of classes and/or the plurality of types.

The transmission unit 116 according to an embodiment may transmit the data compressed by the adaptive compression unit 114 in a wired and/or wireless manner. The transmission of data may be performed on the basis of a wireless communication protocol such as Wireless Fidelity (WiFi), the 3rd Generation Partnership Project (3GPP), or Long Term Evolution (LTE). In order to transmit data in a wireless manner, the transmission unit 116 may include one or more antennas and/or modems. In an embodiment, the transmission of the data may be performed on the basis of a wired communication protocol such as Ethernet, Local Area Network (LAN), or Wide Area Network (WAN). In order to transmit data in a wired manner, the transmission unit 116 may include an optical-electric converter and/or a modem.

The data output from the transmission unit 116 may be transmitted to the second electronic device 120 through a smart grid. The second electronic device 120 may be an electronic device for collecting data output from one or more electronic devices including the first electronic device 110 in the smart grid. For example, the second electronic device 120 may be a server deployed in a power generating station and/or a power distributing station in the smart grid. For example, the second electronic device 120 may be an electronic device for controlling supply and/or transaction of electric power in the smart grid.

Referring to FIG. 1, the second electronic device 120 may include a reception unit 122, an adaptive restoration unit 124, or a combination thereof. The reception unit 122 and the adaptive restoration unit 124 may electrically communicate to each other through, for example, an electronic element (not shown) such as a communication bus (not shown).

The reception unit 122 of the second electronic device 120 according to an embodiment may receive data from the transmission unit 116 of the first electronic device 110. The reception unit 122 may receive the data of the transmission unit 116 on the basis of a protocol corresponding to the transmission unit 116 of the first electronic device 110. The reception unit 122 may receive data from a plurality of electronic devices deployed in different regions in the smart grid as well as the first electronic device 110.

In response to the reception unit 122 receiving data, the adaptive restoration unit 124 of the second electronic device 120 may restore data that has been output from the sensor unit 112 of the first electronic device 110 from the data of the reception unit 122. The data received from the reception unit 122 may include information for identifying a compression method applied to at least a portion of the data and/or a restoration method corresponding to the compression method. The adaptive restoration unit 124 may perform data restoration on the basis of the information.

In order to reduce a restoration error, the adaptive compression unit 114 may adaptively select a representation matrix to be applied for the compression. For example, the adaptive compression unit 114 may apply different representation matrices to the segments and/or sections of data on the basis of the structure, form, and/or features of the data instead of using a deterministic representation matrix irrespective of the structure, form, and/or features of the data. The adaptive compression unit 114 applying a different representation matrix on the basis of the structure, form, and/or features of the data may be performed on the basis of machine learning. The operation of the adaptive compression unit 114 of FIG. 1 will be described in detail below with reference to FIG. 2.

Figure 2:
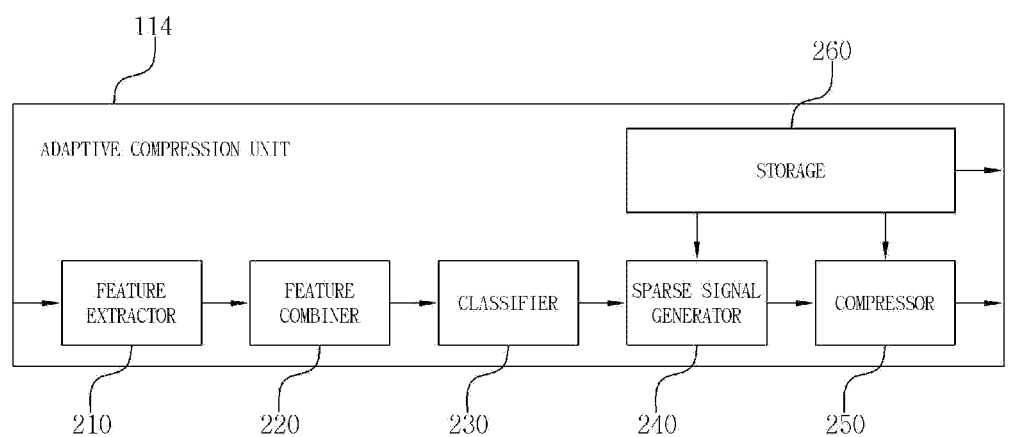
FIG. 2 is a block diagram of an adaptive compression unit included in the first electronic device according to an embodiment.

FIG. 2 is a block diagram 200 of the adaptive compression unit 114 included in the first electronic device according to an embodiment. The adaptive compression unit 114 of FIG. 2 may correspond to the adaptive compression unit 114 of the first electronic device 110 of FIG. 1.

Referring to FIG. 2, the adaptive compression unit 114 may include at least one of a feature extractor 210, a feature combiner 220, a classifier 230, a sparse signal generator 240, a compressor 250, or a storage 260. The adaptive compression unit 114 and one or more components (e.g., the feature extractor 210, the feature combiner 220, the classifier 230, the sparse signal generator 240, the compressor 250, and the storage 260) included in the adaptive compression unit 114 may be stored in a memory in the form of a set of instructions such as routines, sub-routines, applications, firmware, drivers, or system software. Alternatively, the adaptive compression unit 114 and the one or more components included in the adaptive compression unit 114 may be deployed in an electronic device (e.g., the first electronic device 110 of FIG. 1) in the form of hardware such as a processor.

The adaptive compression unit 114 according to an embodiment may segment the received data (the data received from the sensor unit 112 of FIG. 1) into designated sections such as windows (e.g., a time slot and/or a time window). The adaptive compression unit 114 according to an embodiment may extract and combine features for each segmented data section. On the basis of the extracted features and/or feature combinations, the adaptive compression unit 114 may identify a type and/or class corresponding to the section of the data. The adaptive compression unit 114 according to an embodiment may compress the segmented data section on the basis of a representation matrix and/or a measurement matrix corresponding to the identified type and/or class. The above-described operation of the adaptive compression unit 114 may be performed on the basis of one or more components included in block diagram 200 of FIG. 2.

Referring to FIG. 2, the feature extractor 210 according to an embodiment may identify statistics features or time-series features, frequency-related features of data (e.g., data output from one or more sensors connected to the adaptive compression unit 114). The feature extractor 210 may segment data into designated sections such as a time window. In this case, the time-series features, frequency-related features identified by the feature extractor 210 may be identified for each segmented data section.

The feature combiner 220 according to an embodiment may combine the features extracted by the feature extractor 210. The combination may be generated for each segmented data section.

The classifier 230 according to an embodiment may identify a class and/or type corresponding to the combination of features on the basis of machine learning. The class and/or type may be associated with a compression method corresponding to at least a portion of the data. For example, different classes may correspond to different compression methods. A neural network used for the classifier 230 to identify the class and/or type may be trained to mitigate a restoration error measured on the basis of, for example, Root Mean Square Error (RMSE).

The sparse signal generator 240 according to an embodiment may apply a representation matrix to at least a portion of the data segmented by the feature extractor 210 on the basis of the representation matrix corresponding to the class and/or type identified by the classifier 230. The at least a portion of the data to which the representation matrix is applied may be referenced as a sparse signal. For example, the sparse signal may be generated using Equation 1:

$$P=\Psi s. \qquad \text{[Equation 1]}$$

Referring to Equation 1, $\Psi$ may be an N-dimensional real-number matrix ($R^{N \times N}$) as a representation matrix. In Equation 1, s may be an N-dimensional real-number matrix ($R^{N \times N}$) as an electric power signal, for example, at least a portion of the data input to the adaptive compression unit 114 (e.g., the data output from the sensor unit 112 of FIG. 1). N may refer to the length of the electric power signal s. In Equation 1, P may indicate a sparse signal as a result of applying the representation matrix to at least a portion of the data.

The representation matrix may be an N-dimensional matrix including parameters for Discrete Fourier Transform (DFT), Haar Wavelet Transform (HWT), or Discrete Cosine Transform (DCT) to be applied to the data. For example, the adaptive compression unit 114 may store a plurality of designated representation matrices corresponding to the DFT, the HWT, and the DCT in the storage 260. Based on the class classified by the classifier 230, the sparse signal generator 240 may select one of the plurality of designated representation matrices and apply the selected representation matrix to at least a portion of the data. The correspondence between the class and the representation matrix may be identified by the sparse signal generator 240 on the basis of the information stored in the storage 260.

For example, for each section of data, the classifier 230 may identify a class corresponding to the section on the basis of a pattern of a signal in the corresponding section. In response to the identification of the class, the sparse signal generator 240 may apply a representation matrix corresponding to the identified class.

The compressor 250 according to an embodiment may apply a measurement matrix corresponding to the class identified by the classifier 230, which is one of a plurality of designated measurement matrices stored in the storage 260, to a sparse signal output from the sparse signal generator 240. For example, a compressed signal y output from the compressor 250 may be generated using Equation 2:

$$y=\Phi\Psi s.$$ [Equation 2]

Referring to Equation 2, $\Psi$ may correspond to the representation matrix $\Psi$ of Equation 1, and s may correspond to the electric power signal of Equation 1. In Equation 2, $\Phi$ is a measurement matrix and may be defined as Equation 3:

$$\Phi=[\phi_1^T;\phi_2^T;\ldots;\phi_M^T;].$$ [Equation 3]

For example, the measurement matrix may be selected from a Gaussian measurement matrix $$\left(\phi_{m,k} \sim N\left(0, \frac{1}{M}\right)\right)$$

or Bernoulli measurement matrix $$\left(\phi_{m,k} \in \left\{-\frac{1}{\sqrt{M}}, \frac{1}{\sqrt{M}}\right\}\right).$$

Similar to the sparse signal generator 240, based on the class classified by the classifier 230, the compressor 250 may select one of the plurality of designated measurement matrices and apply the selected measurement matrix to the sparse signal. The correspondence between the class and the measurement matrix may be identified by the compressor 250 on the basis of the information stored in the storage 260.

For example, for each section of data, the compressor 250 may identify a class corresponding to a pattern of a signal in the corresponding section. In response to the identification of the class, the compressor 250 may apply a measurement matrix corresponding to the identified class.

The storage 260 according to an embodiment may store information indicating the representative matrix and/or the measurement matrix corresponding to the class and/or feature of the electric power signal and/or the data. The storage 260 according to an embodiment may store information for displaying a compression method applied to each of the sections of the electric power signal and/or data (e.g., the segmented section of the electric power signal and/or data on the basis of a time window).

Referring to FIG. 2, the adaptive compression unit 114 may output a compressed signal that is generated by the compressor 250 on the basis of, for example, Equation 2. While outputting the compressed signal, the adaptive compression unit 114 may output the information stored in the storage 260, for example, information indicating a compression method applied for each of the sections of the electric power signal and/or data. As in an embodiment of FIG. 1, the information and/or the compressed signal output from the adaptive compression unit 114 may be transmitted in the form of a wired signal and/or a wireless signal. The operation of the components of the adaptive compression unit 114 classifying and compressing data will be described in detail below with reference to FIG. 3.

Figure 3:
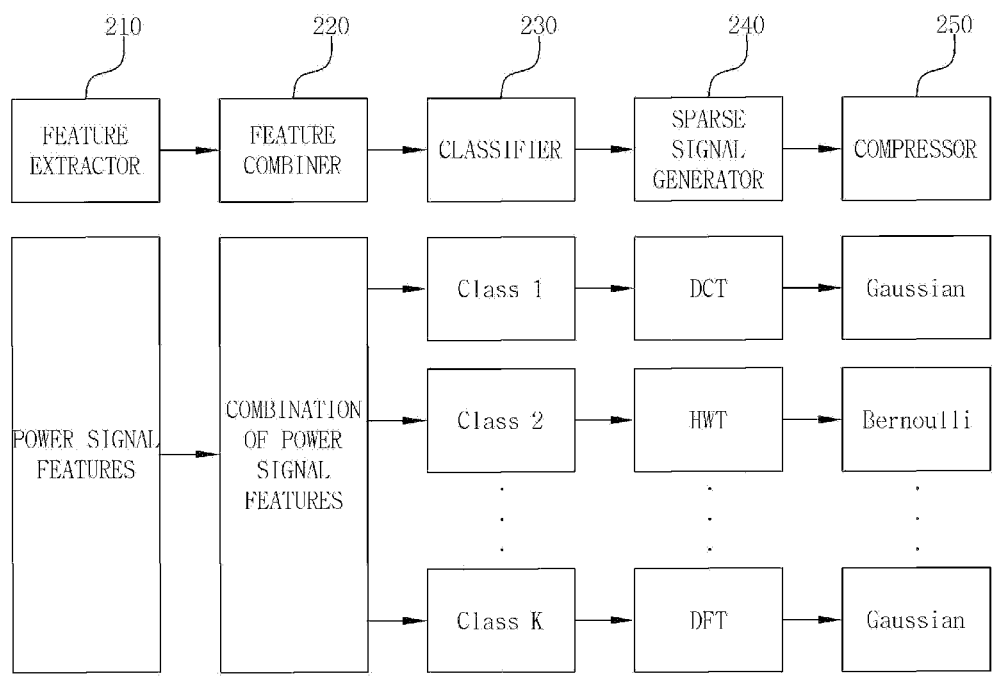
FIG. 3 is a block diagram illustrating an operation in which a signal is compressed by the adaptive compression unit of the first electronic device according to an embodiment.

FIG. 3 is a block diagram 300 illustrating an operation in which a signal is compressed by the adaptive compression unit of the first electronic device according to an embodiment. The operation of FIG. 3 may be performed by the adaptive compression unit 114 of the first electronic device 110 of FIG. 1 and/or the adaptive compression unit 114 of FIG. 2. A feature extractor 210, a feature combiner 220, a classifier 230, a sparse signal generator 240, and a compressor 250 of FIG. 3 may correspond to the feature extractor 210, the feature combiner 220, the classifier 230, the sparse signal generator 240, and the compressor 250 of FIG. 2, respectively.

Referring to FIG. 3, the feature extractor 210 may extract features of a signal (e.g., an electric power signal including data associated with consumption and/or generation of electric power) collected from one or more sensors connected to the adaptive compression unit. The feature may be extracted for each signal section based on a designated size and/or a designated time section, such as a time window.

Referring to FIG. 3, the feature combiner 220 may combine the extracted features. The classifier 230 may identify a class corresponding to each section of the signal on the basis of the combined features. For example, the classifier 230 may identify a class corresponding to a signal section from among K designated classes. The classifier 230 identifying a class corresponding to a signal section from among K designated classes may be performed on the basis of, for example, machine learning.

Referring to FIG. 3, the sparse signal generator 240 may apply a representation matrix to the signal section on the basis of the identified class. For example, the sparse signal generator 240 may apply Discrete Cosine Transform (DCT) to a signal section classified as class 1, which is one of the K classes. For example, the sparse signal generator 240 may apply Haar Wavelet Transform (HWT) to a signal section classified as class 2. For example, the sparse signal generator 240 may apply Discrete Fourier Transform (DFT) to a signal section classified as class K. The sparse signal generator 240 applying the DCT, HWT, and DFT may mean that representation matrices corresponding to the DCT, HWT, and DFT are applied to at least a portion of a signal (e.g., a signal section).

Referring to FIG. 3, the compressor 250 may apply a measurement matrix to a signal section on the basis of the identified class. For example, the compressor 250 may apply a Gaussian measurement matrix to the signal section classified as class 1. As another example, the compressor 250 may apply a Bernoulli measurement matrix to the signal section classified as class 2.

Referring to FIG. 3, the representation matrix and the measurement matrix may be differently mapped or combined for each class. For example, for class 1, the representation matrix corresponding to DCT may be mapped to the Gaussian measurement matrix. As another example, for class 2, the representation matrix corresponding to HWT may be mapped to the Bernoulli measurement matrix. The combination of the class, the representation matrix, and the measurement matrix may be based on machine learning. For example, the classifier 230 may learn the combination of the class, the representation matrix, and the measurement matrix to mitigate a restoration error. Based on a result of the learning, the classifier 230 may classify signal sections into different classes.

Figure 4:
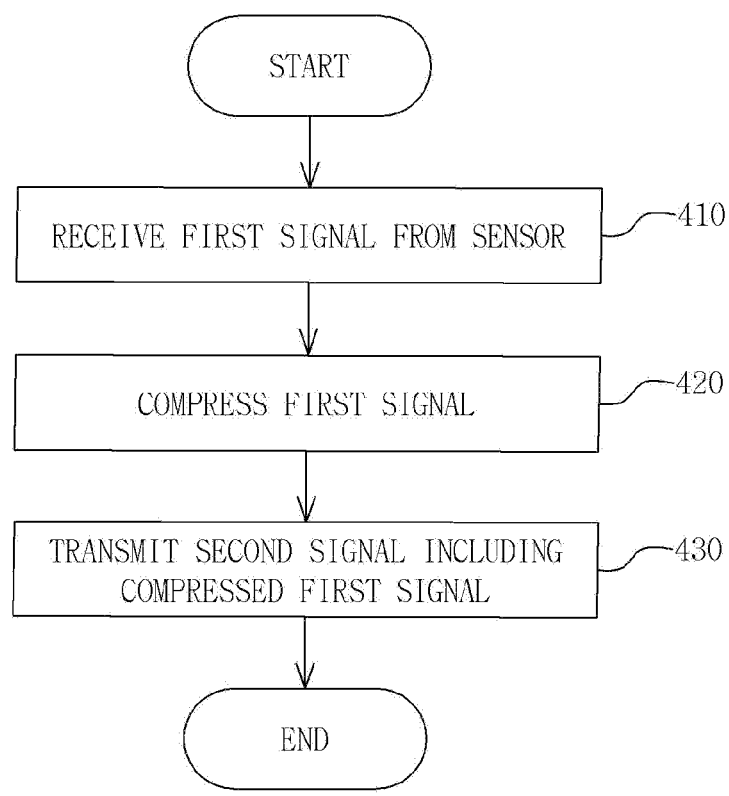
FIG. 4 is a flowchart illustrating operation of the first electronic device according to various embodiments.

FIG. 4 is a flowchart 400 illustrating operation of the first electronic device according to various embodiments. The first electronic device of FIG. 4 may correspond to the first electronic device 110 of FIG. 1. The operation of FIG. 4 may be performed by a component included in the first electronic device 110 of FIG. 1, for example, the sensor unit 112, the adaptive compression unit 114, and/or the transmission unit 116.

Referring to FIG. 4, in operation 410, the first electronic device according to an embodiment may receive a first signal from a sensor. The sensor may be a sensor for detecting data associated with energy consumption of a target device such as the sensor unit 112 of FIG. 1. The first signal is a signal output from the sensor and, for example, may be an electric power signal including data associated with consumption and/or generation of electric power.

In response to the reception of the first signal, in operation 420, the first electronic device according to an embodiment may compress the first signal. The compression of the first signal may be adaptively performed by, for example, the adaptive compression unit 114 of FIG. 1 and/or FIG. 2. In an embodiment, the first electronic device may apply a different representation matrix and a different measurement matrix to each time window of the first signal to adaptively compress the first signal. The representation matrix and the measurement matrix which are applied to each time window by the first electronic device may be selected based on a neural network. An operation of the first electronic device compressing the first signal may be performed similarly to those described with reference to FIGS. 1 to 3.

In response to the compression of the first signal, in operation 430, the first electronic device according to an embodiment may transmit a second signal including the compressed first signal. For example, the second signal may include a first signal compressed for each time window in operation 420. For example, the second signal may include information for identifying the representation matrix and the measurement matrix applied differently for each time window. The second signal may be transmitted to an external electronic device (e.g., the second electronic device 120 of FIG. 1) distinct from the first electronic device. An operation of the external electronic device receiving the second signal will be described in detail below with reference to FIGS. 5 and 6.

Figure 5:
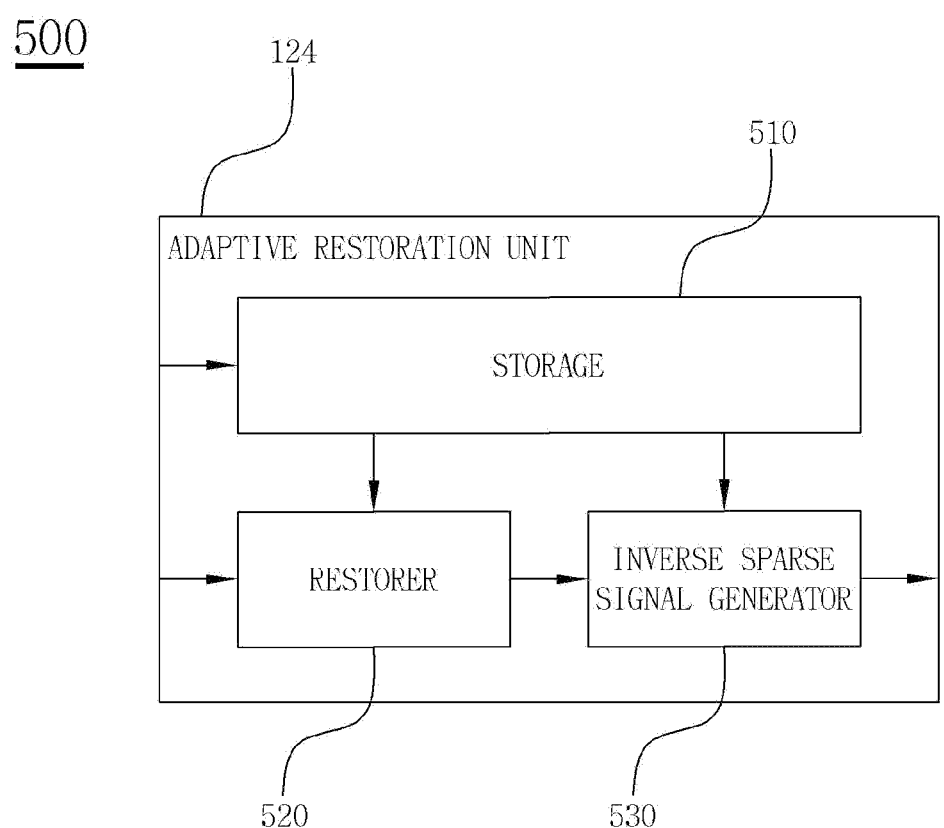
FIG. 5 is a block diagram of an adaptive restoration unit of the second electronic device according to an embodiment.

FIG. 5 is a block diagram 500 of the adaptive restoration unit 124 of the second electronic device according to an embodiment. The adaptive restoration unit 124 of FIG. 5 may correspond to the adaptive restoration unit 124 of the second electronic device 120 of FIG. 1. Referring to FIG. 5, the adaptive restoration unit 124 may include at least one of a storage 510, a restorer 520, and an inverse sparse signal generator 530. The adaptive restoration unit 124 and one or more components (e.g., the storage 510, the restorer 520, and the inverse sparse signal generator 530) included in the adaptive restoration unit 124 may be stored in a memory in the form of a set of instructions such as routines, subroutines, applications, firmware, drivers, or system software. Alternatively, the adaptive restoration unit 124 and the one or more components included in the adaptive restoration unit 124 may be deployed in an electronic device (e.g., the second electronic device 120 of FIG. 1) in the form of hardware such as a processor.

The storage 510 according to an embodiment may store information indicating the representative matrix and/or the measurement matrix corresponding to the class and/or feature of the power signal and/or the data. For example, the information stored in the storage 510 may correspond to the information stored in the storage 260 of the adaptive compression unit 114 of FIG. 2.

The restorer 520 according to an embodiment may restore a sparse signal (e.g., a signal generated by the sparse signal generator 240 of FIG. 2) from a compressed signal on the basis of the characteristics of the electric power signal stored in the storage 510. For example, for a sparse signal x ($=\Psi s$) used to generate a compressed signal y ($=\Phi x$) received by the second electronic device including the adaptive restoration unit 124, the restorer 520 may acquire a restored sparse signal $\hat{x}$ using Equation 4:

$$\hat{x}=\arg\min\|x\|_1 \text{ such that } \Phi_x=y.$$ [Equation 4]

The restorer 520 may acquire the sparse signal $\hat{x}$ satisfying Equation 4 on the basis of measurement matrix information stored in the storage 510. For example, information associated with Gaussian measurement matrices or Bernoulli measurement matrices may be stored in the storage 510. The restorer 520 may identify a measurement matrix corresponding to at least a portion of a received signal among the Gaussian measurement matrices or the Bernoulli measurement matrices. Based on the identified measurement matrix, the restorer 520 may acquire the restored sparse signal $\hat{x}$.

The inverse sparse signal generator 530 according to an embodiment may acquire a restored electric power signal $\hat{s}$ using the representation matrix used to generate the received signal. For example, the inverse sparse signal generator 530 may acquire the restored electric power signal $\hat{s}$ using Equation 5.

$$\hat{s}=\Psi^T(\Psi\Psi^T)^{-1}\hat{x}$$ [Equation 5]

Referring to Equation 5, $\Psi$ may correspond to the representation matrix $\Psi$ of Equation 1. The representation matrix $\Psi$ used by the inverse sparse signal generator 530 may be a representation matrix used to generate at least a portion of a signal received by the adaptive restoration unit 124. For example, the representation matrix $\Psi$ is a representation matrix selected to mitigate a restoration error on the basis of machine learning. Accordingly, it is possible to reduce an error contained in the restored electric power signal $\hat{s}$ output from the adaptive restoration unit 124.

Figure 6:
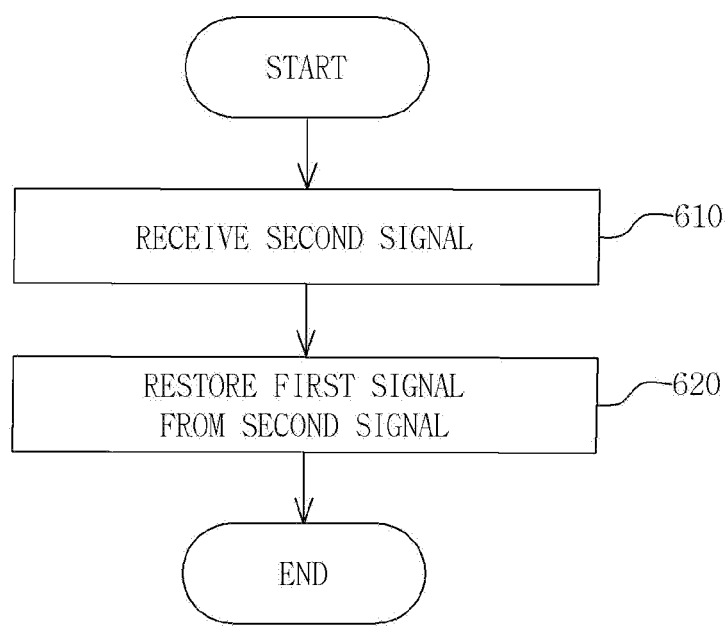
FIG. 6 is a flowchart illustrating operation of the second electronic device according to various embodiments.

FIG. 6 is a flowchart 600 illustrating operation of the second electronic device according to various embodiments. The second electronic device of FIG. 6 may correspond to the second electronic device 120 of FIG. 1. The operation of FIG. 6 may be performed by a component included in the second electronic device 120 of FIG. 1, for example, the reception unit 122 or the adaptive restoration unit 124.

Referring to FIG. 6, in operation 610, the second electronic device according to an embodiment may receive a second signal transmitted from the first electronic device. The second signal may correspond to the second signal that is output based on operation 430 of FIG. 4.

In response to the reception of the second signal, in operation 620, the second electronic device according to an embodiment may restore the first signal used to generate the second signal. The first signal may correspond to the first signal in operation 410 of FIG. 4. The second electronic device restoring the first signal on the basis of operation 620 may be performed on the basis of, for example, the adaptive restoration unit 124 of FIG. 5. For example, the first signal restored on the basis of operation 620 may correspond to $\hat{s}$ of Equation 5.

The second electronic device according to an embodiment may identify, as the information included in the second signal, information indicating a representation matrix and a measurement matrix applied for each of a plurality of time windows. Based on the information, the second electronic device may restore the first signal by applying Equations 4 and 5 to the second signal.

When compressing and restoring data received from a sensor, the first electronic device and the second electronic device according to various embodiments may apply a different compression method and a corresponding restoration method for each data section. The compression method and restoration method applied for each data section may be differently selected and/or applied on the basis of features and/or combinations of features of data in each section using machine learning. By applying the compression method and the restoration method differently for each data section, it is possible to increase the compression and restoration performance of the entire data.

Figure 7:
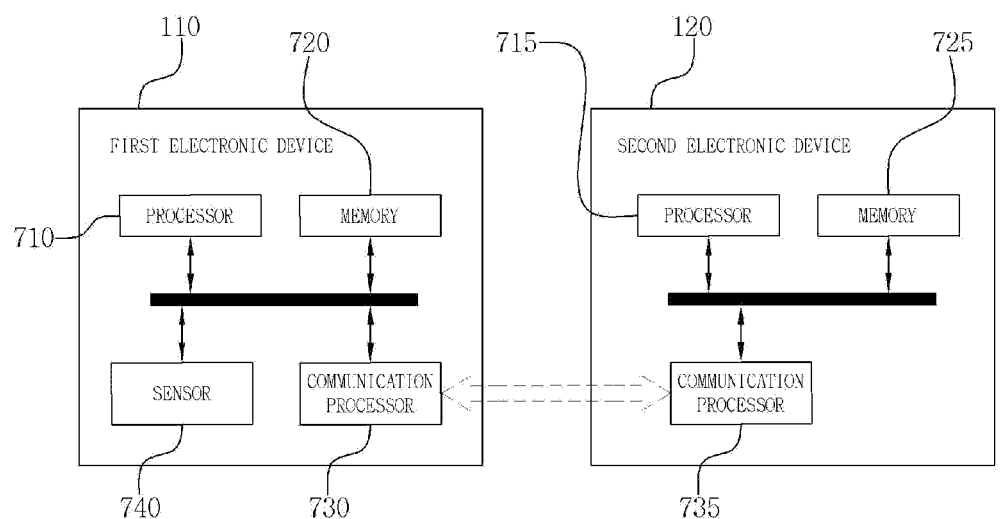
FIG. 7 is a block diagram illustrating hardware components included in the first electronic device and the second electronic device according to various embodiments.

FIG. 7 is a block diagram 700 illustrating hardware components included in the first electronic device 110 and the second electronic device 120 according to various embodiments. The first electronic device 110 and the second electronic device 120 of FIG. 7 may correspond to the first electronic device 110 and the second electronic device 120 of FIG. 1. The first electronic device 110 of FIG. 7 may perform the operation of flowchart 400 of FIG. 4. The second electronic device 120 of FIG. 7 may perform the operation of flowchart 600 of FIG. 6.

Referring to FIG. 7, the first electronic device 110 may include at least one of a processor 710, a memory 720, a sensor 740, and a communication processor 730. The processor 710, the memory 720, the sensor 740, and the communication processor 730 may be connected to each other through an electronic component such as a communication bus. The numbers of processors 710, memories 720, sensors 740, and communication processors 730 included in the first electronic device 110 are not limited to those shown in FIG. 7.

The processor 710 of the first electronic device 110 according to an embodiment may include a hardware component for processing data on the basis of one or more instructions. The hardware component for processing data may include, for example, an arithmetic and logic unit (ALU), a field programmable gate array (FPGA) and/or a central processing unit (CPU). There may be one or more processors 710. For example, a plurality of processors 710 may be included in the first electronic device 110 on the basis of dual-cores, quad-cores, or hexa-cores.

The memory 720 of the first electronic device 110 according to an embodiment may include a hardware component for storing instructions and/or data to be input to and/or output from the processor 710. The memory 720 may include, for example, a volatile memory such as a random-access memory (RAM) and/or a non-volatile memory such as a read-only memory (ROM). The volatile memory may include at least one of, for example, a dynamic RAM (DRAM), a static RAM (SRAM), a cache RAM, and a pseudo SRAM (PSRAM). The non-volatile memory may include at least one of a programmable ROM (PROM), an erasable PROM (EPROM), an electrically erasable PROM (EEPROM), a flash memory, a hard disk, a compact disc, and an embedded multi-media card (eMMC).

One or more instructions indicating an operation performed on data by the processor 710 may be stored in the memory 720. A set of instructions may be referred to as firmware, an operating system, a process, a routine, a sub-routine, and/or an application. For example, the first electronic device 110 and/or the processor 710 of the first electronic device 110 may execute a set of a plurality of instructions distributed in the form of an application and may perform the operations of the first electronic device 110 of FIGS. 1 to 4.

According to an embodiment, the communication processor 730 may include a hardware component for supporting transmission and/or reception of electric signals between the first electronic device 110 and the second electronic device 120. For example, the communication processor 730 may transmit the second signal of operation 430 of FIG. 4 to the second electronic device 120. The communication processor 730 may include at least one of, for example, a modem, an antenna, an optic-to-electronic converter.

Referring to FIG. 7, the second electronic device 120 may include at least one of a processor 715, a memory 725, and a communication processor 735. The processor 715, the memory 725, and the communication processor 735 may be connected to each other through an electronic component such as a communication bus. The numbers of processors 715, memories 725, and communication processors 735 included in the second electronic device 120 are not limited to those shown in FIG. 7. The processor 715, the memory 725, and the communication processor 735 of the second electronic device 120 may be hardware components similar to the processor 710, the memory 720, and the communication processor 730 of the first electronic device 110, respectively. Hereinafter, in the following description of the processor 715, the memory 725, and the communication processor 735, a redundant description of the processor 710, the memory 720, and the communication processor 730 will be omitted.

The communication processor 735 may receive an electric signal transmitted from the communication processor 730. The communication processor 735 may transmit an electric signal received from the processor 715 and/or the memory 725. The second electronic device 120 and/or the processor 715 of the second electronic device 120 may execute a set of a plurality of instructions stored in the memory 725 and may perform the operations of the second electronic device 120 of FIGS. 5 and 6. For example, the second electronic device 120 and/or the processor 715 of the second electronic device 120 may restore data output by the sensor 740 from the received electric signal.

The first electronic device 110 according to various embodiments may select one of the plurality of representation matrices and one of the plurality of measurement matrices on the basis of the pattern and/or feature of the data received from the sensor 740. The selection of the representation matrix and the measurement matrix may be performed on the basis of machine learning. Based on the selected representation matrix and measurement matrix, the first electronic device 110 may adaptively compress at least a portion of the data. The second electronic device 120 according to various embodiments may restore the compressed data on the basis of the result of selecting the representation matrix and the measurement matrix. Since the representation matrix and the measurement matrix are dynamically selected on the basis of machine learning, it is possible to decrease an error of the data restored by the second electronic device 120 (e.g., a restoration error).

An electronic device according to various embodiments may include at least one sensor, a communication processor, a memory, and at least one processor operably coupled to the at least one sensor, the communication processor, and the memory. The memory may store a plurality of instructions. When the plurality of instructions are executed by the at least one processor, the at least one processor may perform control to identify a first signal output from the at least one sensor, compress a first part of the first signal on the basis of first information in response to the identification of the first signal, compress a second part of the first signal distinct from the first part on the basis of second information distinct from the first information, acquire a second signal including the compressed first part and the compressed second part, and transmit the second signal to an external electronic device distinct from the electronic device using a communication processor in response to the acquisition of the second signal.

In the electronic device according to an embodiment, when the plurality of instructions are executed by the at least one processor, the at least one processor may perform control to identify the first part and the second part on the basis of a plurality of time windows in which the first signal is received in response to the identification of the first signal.

In the electronic device according to an embodiment, when the plurality of instructions are executed by the at least one processor, the at least one processor may perform control to identify time and frequency features of the first part of the first signal in response to the identification of the first signal and acquire the first information used to compress the first part in response to the identification of the time and frequency features of the first part.

In the electronic device according to an embodiment, when the plurality of instructions are executed by the at least one processor, the at least one processor may perform control to acquire the first information including at least one of a first matrix for applying at least one of Discrete Fourier Transform, Haar Wavelet Transform, and Discrete Cosine Transform to the first part on the basis of the time and frequency features of the first part and a second matrix for applying at least one of Gaussian measurement matrix and Bernoulli measurement matrix to the first part on the basis of the time and frequency features of the first part.

In the electronic device according to an embodiment, when the plurality of instructions are executed by the at least one processor, the at least one processor may perform control to sequentially apply the first matrix and the second matrix to the first part on the basis of the first information.

In the electronic device according to an embodiment, when the plurality of instructions are executed by the at least one processor, the at least one processor may perform control to acquire the second signal including the compressed first part, the compressed second part, first data indicating that the first part is compressed based on the first information, and second data indicating that the second part is compressed based on the second information.

An electronic device according to various embodiments may include a communication processor, a memory, and at least one processor operably coupled to the communication processor and the memory. The memory may store a plurality of instructions. When the plurality of instructions are executed by the at least one processor, the at least one processor may perform control to receive a first signal from an external electronic device distinct from the electronic device using the communication processor, acquire information corresponding to at least a portion of the first signal in response to the reception of the first signal, and restore a second signal corresponding to the first signal by changing at least a portion of the first signal on the basis of the information in response to the acquisition of the information.

In the electronic device according to an embodiment, when the plurality of instructions are executed by the at least one processor, the at least one processor may perform control to identify the information including a first matrix and a second matrix from the first signal, the first matrix and the second matrix being applied to at least a portion of the first signal by the external electronic device.

In the electronic device according to an embodiment, the first matrix may be used by the external electronic device to perform at least one of Discrete Fourier Transform, Haar Wavelet Transform, and Discrete Cosine Transform, and the second matrix may correspond to one of Gaussian measurement matrix and Bernoulli measurement matrix.

In the electronic device according to an embodiment, when the plurality of instructions are executed by the at least one processor, the at least one processor may perform control to identify at least a portion of the first signal on the basis of at least one time window in response to the reception of the first signal.

The electronic devices according to various embodiments may efficiently compress data while reducing a restoration error.

The devices described herein may be implemented using hardware components, software components, and/or some combinations thereof. For example, the devices and components described herein may be implemented with one or more general-purpose computers or special-purpose computers, such as, for example, a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may run an operating system (OS) and one or more software applications that run on the OS. Also, the processing device also may access, store, manipulate, process, and create data in response to execution of the software. For convenience of understanding, a single processing device has been described as being used, but those skilled in the art will appreciate that the processing device may include a plurality of processing elements and/or a plurality of types of processing elements. For example, the processing device may include a plurality of processors or one processor and one controller. In addition, the processing device may have another processing configuration, such as a parallel processor.

The software may include a computer program, a piece of code, an instruction, or some combination thereof, for independently or collectively instructing or configuring the processing device as desired. Software and/or data may be embodied permanently or temporarily in any type of machine, component, physical or virtual equipment, computer storage medium or device, or a propagated signal wave in order to provide instructions or data to, or be interpreted by, the processing device. The software may also be distributed over network coupled computer systems so that the software is stored and executed in a distributed fashion. Software and data may be stored in one or more computer-readable recording media.

The method according to an embodiment may be implemented as program instructions executable by a variety of computer means and may be recorded on a computer-readable medium. The computer-readable medium may include, alone or in combination, program instructions, data files, data structures, and the like. The program instructions recorded on the medium may be designed and configured specifically for an embodiment or may be publicly known and usable to those who are skilled in the field of computer software. Examples of the computer-readable recording medium include a magnetic medium, such as a hard disk, a floppy disk, and a magnetic tape, an optical medium, such as a compact disc read-only memory (CD-ROM), a digital versatile disc (DVD), etc., a magneto-optical medium such as a floptical disk, and a hardware device specially configured to store and perform program instructions, for example, a read-only memory (ROM), a random access memory (RAM), a flash memory, etc. Examples of the computer instructions include not only machine language code generated by a compiler, but also high-level language code executable by a computer using an interpreter or the like. The hardware device may be configured to operate as one or more software modules in order to perform operations of an embodiment, and vise versa.

Although the present invention has been described with reference to specific embodiments and drawings, it will be appreciated that various modifications and changes can be made from the invention by those skilled in the art. For example, appropriate results may be achieved although the described techniques are performed in an order different from that described above and/or although the described components such as a system, a structure, a device, or a circuit are combined in a manner different from that described above and/or replaced or supplemented by other components or their equivalents.

Therefore, other implementations, embodiments, and equivalents are within the scope of the following claims.

What is claimed is:

1. An electronic device comprising:
   at least one sensor;
   a communication processor;
   a memory; and
   at least one processor operably coupled to the at least one sensor, the communication processor, and the memory, wherein
   the memory stores a plurality of instructions, and
   when the plurality of instructions are executed by the at least one processor, the at least one processor performs control to:
      identify a first signal output from the at least one sensor;
      compress a first part of the first signal on the basis of first information in response to the identification of the first signal;
      compress a second part of the first signal distinct from the first part on the basis of second information distinct from the first information;
      acquire a second signal including the compressed first part and the compressed second part; and
      transmit the second signal to an external electronic device distinct from the electronic device using the communication processor, in response to the acquisition of the second signal.

2. The electronic device of claim 1, wherein when the plurality of instructions are executed by the at least one processor, the at least one processor performs control to identify the first part and the second part on the basis of a plurality of time windows in which the first signal is received in response to the identification of the first signal.

3. The electronic device of claim 1, wherein when the plurality of instructions are executed by the at least one processor, the at least one processor performs control to:
   identify time and frequency features of the first part of the first signal in response to the identification of the first signal; and
   acquire the first information used to compress the first part in response to the identification of the time and frequency features of the first part.

4. The electronic device of claim 3, wherein when the plurality of instructions are executed by the at least one processor, the at least one processor performs control to acquire the first information comprising at least one of:
   a first matrix for applying at least one of Discrete Fourier Transform, Haar Wavelet Transform, and Discrete Cosine Transform to the first part on the basis of the time and frequency features of the first part; and
   a second matrix for applying at least one of Gaussian measurement matrix and Bernoulli measurement matrix to the first part on the basis of the time and frequency features of the first part.

5. The electronic device of claim 4, wherein when the plurality of instructions are executed by the at least one processor, the at least one processor performs control to sequentially apply the first matrix and the second matrix to the first part on the basis of the first information.

6. The electronic device of claim 1, wherein when the plurality of instructions are executed by the at least one processor, the at least one processor performs control to acquire the second signal including the compressed first part, the compressed second part, first data indicating that the first part is compressed based on the first information, and second data indicating that the second part is compressed based on the second information.

7. An electronic device comprising:
   a communication processor;
   a memory; and
   at least one processor operably coupled to the communication processor and the memory,
   wherein
   the memory stores a plurality of instructions, and
   when the plurality of instructions are executed by the at least one processor, the at least one processor performs control to:
      receive a first signal from an external electronic device distinct from the electronic device using the communication processor;
      acquire information corresponding to at least a portion of the first signal in response to the reception of the first signal; and
      restore a second signal corresponding to the first signal by changing at least the portion of the first signal on the basis of the information in response to the acquisition of the information.

8. The electronic device of claim 7, wherein when the plurality of instructions are executed by the at least one processor, the at least one processor performs control to identify the information including a first matrix and a second matrix from the first signal, the first matrix and the second matrix being applied to at least the portion of the first signal by the external electronic device.

9. The electronic device of claim 8, wherein
   the first matrix is used by the external electronic device to perform at least one of Discrete Fourier Transform, Haar Wavelet Transform, and Discrete Cosine Transform, and
   the second matrix corresponds to one of Gaussian measurement matrix and Bernoulli measurement matrix.

10. The electronic device of claim 7, wherein when the plurality of instructions are executed by the at least one processor, the at least one processor performs control to identify at least the portion of the first signal on the basis of at least one time window in response to the reception of the first signal.

* * * * *